United States Patent
Eto et al.

(10) Patent No.: US 9,611,934 B2
(45) Date of Patent: Apr. 4, 2017

(54) SHIFT CONTROL APPARATUS FOR AUTOMATIC TRANSMISSION

(71) Applicant: HONDA MOTOR CO., LTD., Tokyo (JP)

(72) Inventors: Masashi Eto, Wako (JP); Yoshiharu Saito, Wako (JP); Hiroki Endo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 69 days.

(21) Appl. No.: 14/724,871

(22) Filed: May 29, 2015

(65) Prior Publication Data
US 2015/0345633 A1  Dec. 3, 2015

(30) Foreign Application Priority Data
May 30, 2014 (JP) ................. 2014-111978

(51) Int. Cl.
| | | |
|---|---|---|
| *F16H 61/04* | (2006.01) | |
| *F16H 61/688* | (2006.01) | |
| *F16H 59/70* | (2006.01) | |
| *F16H 3/00* | (2006.01) | |

(Continued)

(52) U.S. Cl.
CPC ........ *F16H 61/688* (2013.01); *F16H 61/0403* (2013.01); *F16H 3/006* (2013.01); *F16H 3/10* (2013.01); *F16H 59/70* (2013.01); *F16H 2003/0931* (2013.01); *F16H 2061/0407* (2013.01); *F16H 2061/0429* (2013.01);

(Continued)

(58) Field of Classification Search
CPC .... F16H 61/688; F16H 61/0403; F16H 3/006; F16H 2003/0931; F16H 3/10; F16H 2061/0444; F16H 2061/0407; F16H 59/70; F16H 2061/0429; F16H 2200/0065
See application file for complete search history.

(56) References Cited

U.S. PATENT DOCUMENTS

| | | | |
|---|---|---|---|
| 2003/0100985 A1* | 5/2003 | Matsumura ........... | B60W 10/02 701/55 |
| 2010/0024581 A1* | 2/2010 | Ogami ................ | F16H 61/0213 74/336 R |

(Continued)

FOREIGN PATENT DOCUMENTS

JP   2013-194893   9/2013

*Primary Examiner* — Justin Holmes
*Assistant Examiner* — Lillian Nguyen
(74) *Attorney, Agent, or Firm* — Mori & Ward, LLP

(57) ABSTRACT

A shift control apparatus for an automatic transmission includes a controller. The controller is configured to control the automatic transmission. The automatic transmission includes a first input shaft, a second input shaft, an output shaft, a first clutch, a second clutch, and gear trains. In a case where a standby shift stage does not lie between a predetermined current shift stage and a target shift stage, the controller controls the first clutch to be disengaged and the second clutch to be engaged, and then controls a synchronizing device among synchronizing devices for the predetermined current shift stage to be disengaged and a synchronizing device among the synchronizing devices for the target shift stage to be engaged during a disengagement of the first clutch, and then controls the second clutch to be disengaged and the first clutch to be engaged.

12 Claims, 9 Drawing Sheets

(51) Int. Cl.
*F16H 3/10* (2006.01)
*F16H 3/093* (2006.01)
(52) U.S. Cl.
CPC ............... *F16H 2061/0444* (2013.01); *F16H 2200/0065* (2013.01)

(56) References Cited

U.S. PATENT DOCUMENTS

2011/0269599 A1* 11/2011 Nakasako ................ B60K 6/36
477/5
2012/0245781 A1* 9/2012 Kanamori ................ B60K 6/48
701/22

* cited by examiner

SHIFT CONTROL APPARATUS FOR AUTOMATIC TRANSMISSION

CROSS-REFERENCE TO RELATED APPLICATIONS

The present application claims priority under 35 U.S.C. §119 to Japanese Patent Application No. 2014-111978, filed May 30, 2014, entitled "Shift Control Device for Automatic Transmission." The contents of this application are incorporated herein by reference in their entirety.

BACKGROUND

1. Field

The present disclosure relates to a shift control apparatus for an automatic transmission.

2. Description of the Related Art

When a jump shift between two discrete shift stages is performed in such a twin-clutch automatic transmission, the shift time required to reach a target shift stage varies depending on which of a plurality of shift paths that pass through different shift stages is selected. Japanese Unexamined Patent Application Publication No. 2013-194893 discloses a technique that estimates the shift time for each of shift paths and selects a predetermined shift path in accordance with the estimated shift time to improve shift responsiveness.

SUMMARY

According to one aspect of the present invention, a shift control apparatus for an automatic transmission includes a first input shaft, a second input shaft, an output shaft, a first clutch, a second clutch, and a plurality of gear trains. The first input shaft, the second input shaft, and the output shaft are disposed parallel to each other. The first clutch and the second clutch are capable of transmitting a driving force of a drive source to the first input shaft and the second input shaft, respectively. The plurality of gear trains are capable of establishing a plurality of shift stages through a selecting operation of a plurality of synchronizing devices between the first and second input shafts and the output shaft. When a predetermined current shift stage is established between the output shaft and one input shaft of the first and second input shafts, the one input shaft being an input shaft to which the driving force is transmitted by engagement of one clutch of the first and second clutches, and then a target shift stage different from the current shift stage and at which the one clutch is engaged is estimated on the basis of driving conditions of a vehicle and a driver's intention, a predetermined one of the synchronizing devices is engaged to perform a pre-shift operation which allows standby in a state where the output shaft and the other input shaft of the first and second input shafts, the other input shaft being an input shaft to which the driving force is not currently transmitted, are connected by a gear train for the standby shift stage different from the current shift stage and the target shift stage. When the standby shift stage does not lie between the current shift stage and the target shift stage, the one clutch is disengaged and the other clutch of the first and second clutches is engaged while slipping, and during the disengagement of the one clutch, a synchronizing device for the current shift stage is disengaged and a synchronizing device for the target shift stage is engaged, and then the other clutch is disengaged and the one clutch is engaged.

According to another aspect of the present invention, a shift control apparatus for an automatic transmission includes a controller. The controller is configured to control the automatic transmission. The automatic transmission includes a first input shaft, a second input shaft, an output shaft, a first clutch, a second clutch, and gear trains. The first input shaft, the second input shaft, and the output shaft are disposed parallel to each other. The first clutch and the second clutch are to transmit a driving force of a drive source to the first input shaft and the second input shaft, respectively. The gear trains are to establish shift stages between the first and second input shafts and the output shaft through selecting synchronizing devices. In a case where a predetermined current shift stage is established between the output shaft and the first input shaft to which the driving force is transmitted through engagement of the first clutch and in a case where a target shift stage which is different from the predetermined current shift stage and at which the first clutch is engaged is estimated based on driving conditions of a vehicle and a driver's intention, the controller controls a predetermined one of the synchronizing devices to be engaged to perform a pre-shift operation which connects the output shaft and the second input shaft to which the driving force is not transmitted using a gear train among the gear trains so as to establish a standby shift stage different from the predetermined current shift stage and the target shift stage. In a case where the standby shift stage does not lie between the predetermined current shift stage and the target shift stage, the controller controls the first clutch to be disengaged and the second clutch to be engaged, and then controls a synchronizing device among the synchronizing devices for the predetermined current shift stage to be disengaged and a synchronizing device among the synchronizing devices for the target shift stage to be engaged during a disengagement of the first clutch, and then controls the second clutch to be disengaged and the first clutch to be engaged.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
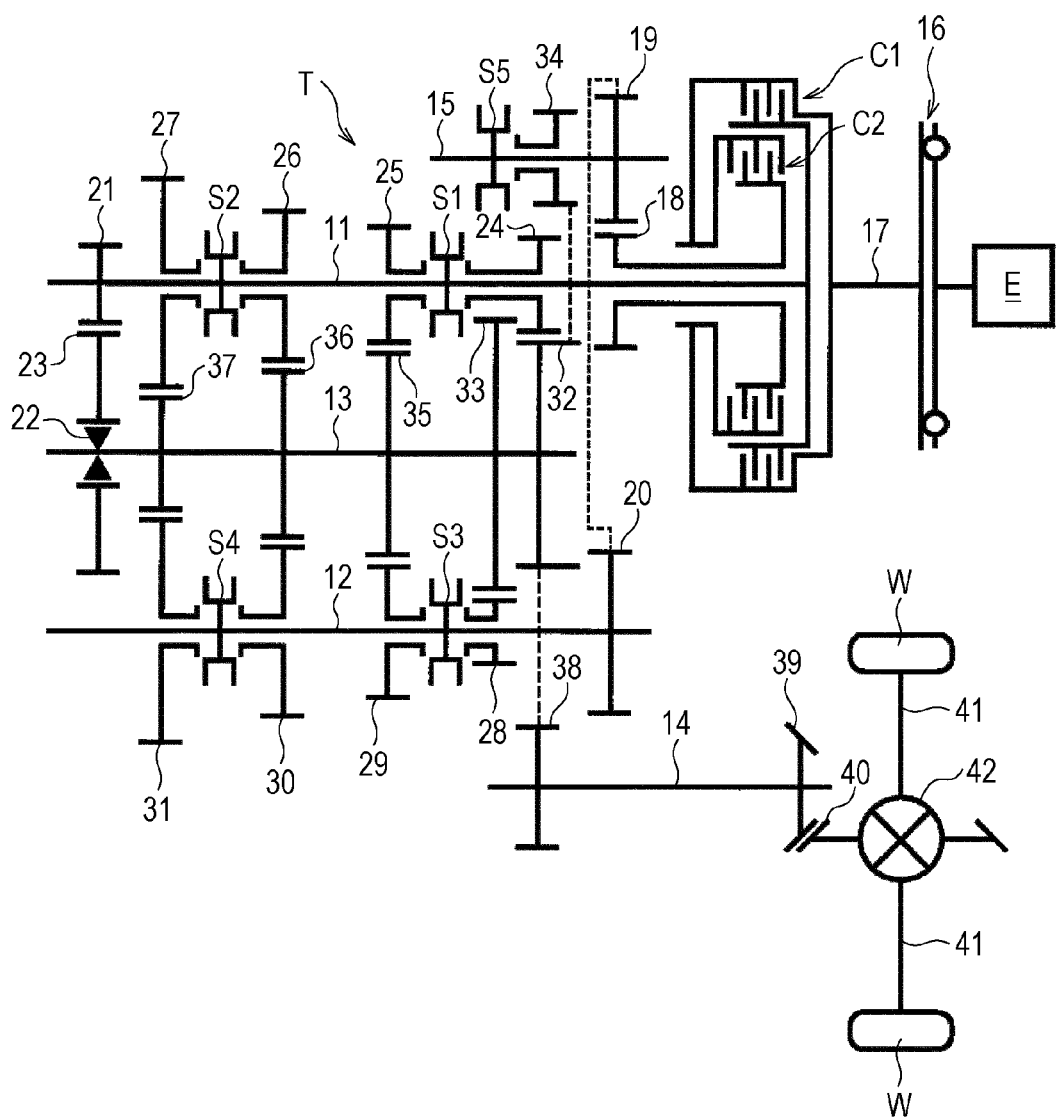
FIG. 1 is a skeleton diagram of a twin-clutch transmission according to an embodiment.

The embodiments will now be described with reference to the accompanying drawings, wherein like reference numerals designate corresponding or identical elements throughout the various drawings.

Embodiments of the present disclosure will now be described with reference to FIGS. 1 to 9.

As illustrated in FIG. 1, a twin-clutch transmission T with nine forward speeds and one reverse speed includes a first input shaft 11, a second input shaft 12, a first output shaft 13, a second output shaft 14, and an idle shaft 15 disposed parallel to each other. A primary input shaft 17 connected via a flywheel 16 to an engine E is connected via a first clutch C1 to the first input shaft 11, and is also connected via a second clutch C2 to a drive gear 18 relatively rotatably supported on the first input shaft 11. The drive gear 18 engages with an idle gear 19 secured to the idle shaft 15, and the idle gear 19 engages with a driven gear 20 secured to the second input shaft 12. Therefore, when the first clutch C1 is engaged, the driving force of the engine E is transmitted from the flywheel 16, through the primary input shaft 17 and the first clutch C1, to the first input shaft 11. When the first clutch C2 is engaged, the driving force of the engine E is transmitted from the flywheel 16, through the primary input shaft 17, the second clutch C2, the drive gear 18, the idle gear 19, and the driven gear 20, to the second input shaft 12.

A first-speed input gear 21 secured to the first input shaft 11 engages with a first-speed output gear 23 supported on the first output shaft 13 via a one-way clutch 22. A third-speed input gear 24 and a fifth-speed input gear 25 are relatively rotatably supported on the first input shaft 11. The third-speed input gear 24 and the fifth-speed input gear 25 can be selectively coupled to the first input shaft 1 via a third-and-fifth speed synchronizing device S1. Similarly, a seventh-speed input gear 26 and a ninth-speed input gear 27 are relatively rotatably supported on the first input shaft 11. The seventh-speed input gear 26 and the ninth-speed input gear 27 can be selectively coupled to the first input shaft 11 via a seventh-and-ninth speed synchronizing device S2.

A second-speed input gear 28 and a fourth-speed input gear 29 are relatively rotatably supported on the second input shaft 12. The second-speed input gear 28 and the fourth-speed input gear 29 can be selectively coupled to the second input shaft 12 via a second-and-fourth speed synchronizing device S3. Similarly, a sixth-speed input gear 30 and an eighth-speed input gear 31 are relatively rotatably supported on the second input shaft 12. The sixth-speed input gear 30 and the eighth-speed input gear 31 can be selectively coupled to the second input shaft 12 via a sixth-and-eighth speed synchronizing device S4.

A third-and-reverse speed output gear 32 engaging with the third-speed input gear 24 is secured to the first output shaft 13. A second-speed output gear 33 engaging with the second-speed input gear 28 is also secured to the first output shaft 13. A reverse idle gear 34 which is relatively rotatably supported on the idle shaft 15 and can be coupled to the idle shaft 15 by a reverse synchronizing device S5 engages with the third-and-reverse speed output gear 32.

The fifth-speed input gear 25 and the fourth-speed input gear 29 engage with a common fourth-and-fifth speed output gear 35, the seventh-speed input gear 26 and the sixth-speed input gear 30 engage with a common sixth-and-seventh speed output gear 36, and the ninth-speed input gear 27 and the eighth-speed input gear 31 engage with a common eighth-and-ninth speed output gear 37.

The third-and-reverse speed output gear 32 engages with a final gear 38 secured to the second output shaft 14, a first bevel gear 39 secured to the second output shaft 14 engages with a second bevel gear 40 on a differential gear 42, and right and left drive wheels W are connected to respective drive shafts 41 extending from the differential gear 42.

Therefore, when the third-and-fifth speed synchronizing device S1 to the reverse synchronizing device S5 are all disengaged, the one-way clutch 22 is engaged and a first-speed shift stage is established. A second-speed shift stage is established when the second-and-fourth speed synchronizing device S3 couples the second-speed input gear 28 to the second input shaft 12. A third-speed shift stage is established when the third-and-fifth speed synchronizing device S1 couples the third-speed input gear 24 to the first input shaft 11. A fourth-speed shift stage is established when the second-and-fourth speed synchronizing device S3 couples the fourth-speed input gear 29 to the second input shaft 12. A fifth-speed shift stage is established when the third-and-fifth speed synchronizing device S1 couples the fifth-speed input gear 25 to the first input shaft 11. A sixth-speed shift stage is established when the sixth-and-eighth speed synchronizing device S4 couples the sixth-speed input gear 30 to the second input shaft 12. A seventh-speed shift stage is established when the seventh-and-ninth speed synchronizing device S2 couples the seventh-speed input gear 26 to the first input shaft 11. An eighth-speed shift stage is established when the sixth-and-eighth speed synchronizing device S4 couples the eighth-speed input gear 31 to the second input shaft 12. A ninth-speed shift stage is established when the seventh-and-ninth speed synchronizing device S2 couples the ninth-speed input gear 27 to the first input shaft 11. A reverse shift stage is established when the reverse synchronizing device S5 couples the reverse idle gear 34 to the idle shaft 15.

Figure 2:
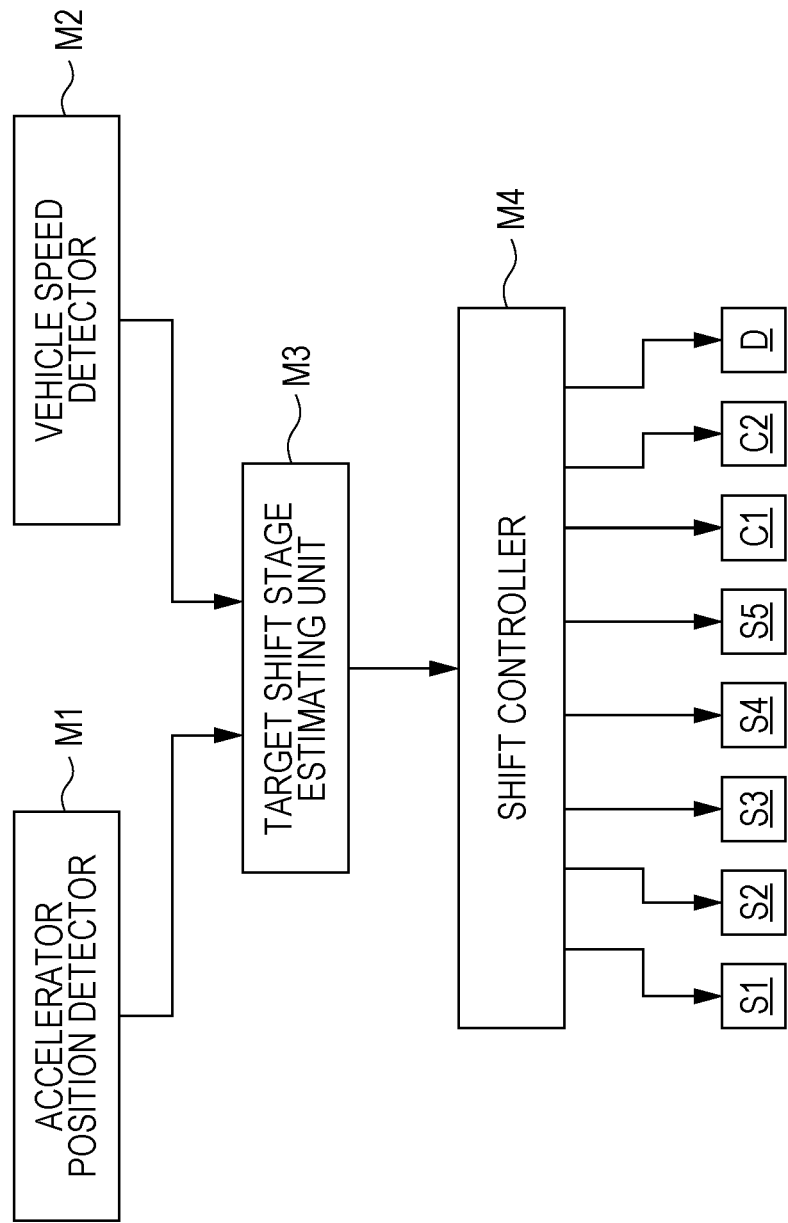
FIG. 2 is a block diagram of a shift control system according to the embodiment.
Figure 3:
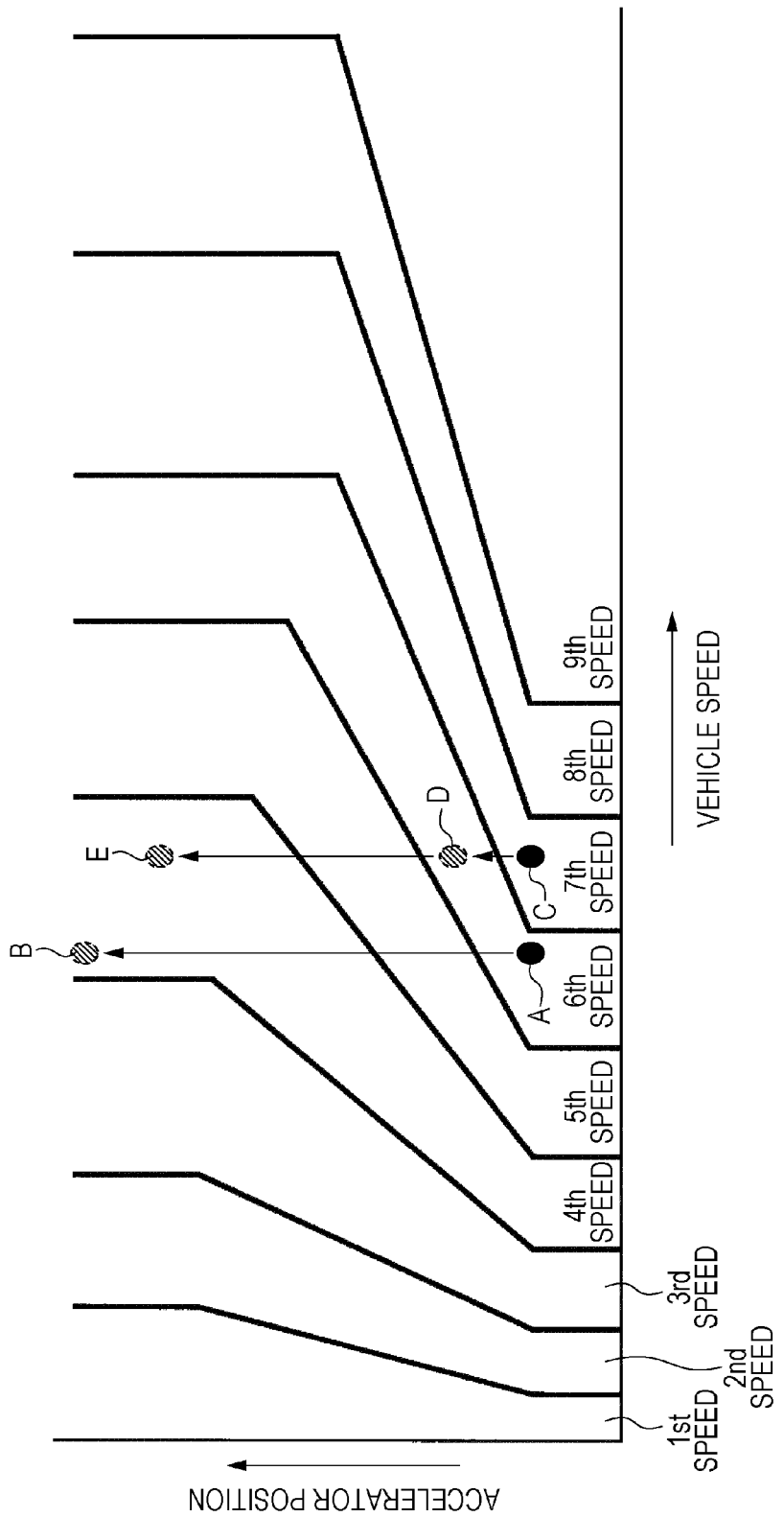
FIG. 3 shows a shift map of the transmission according to the embodiment.

As illustrated in FIG. 2, an accelerator position detector M1 that detects an accelerator position and a vehicle speed detector M2 that detects a vehicle speed are connected to a target shift stage estimating unit M3. By applying the accelerator position and the vehicle speed to a shift map of FIG. 3, the target shift stage estimating unit M3 estimates a target shift stage to be reached by a shift from a current shift stage. To execute a shift from the current shift stage to the target shift stage, a shift controller M4 including a hydraulic circuit of the transmission T controls the actuation of the third-and-fifth speed synchronizing device S1, the seventh-and-ninth speed synchronizing device S2, the second-and-fourth speed synchronizing device S3, the sixth-and-eighth speed synchronizing device S4, the first clutch C1, and the second clutch C2. At the same time, the shift controller M4 displays a currently established shift stage in a display unit D of a meter panel at the driver's seat.

Effects of the embodiment having the above-described configuration will now be described.

In the twin-clutch transmission T of the present embodiment, the first clutch C1 is engaged when an odd-numbered shift stage (i.e., the first-speed shift stage, the third-speed shift stage, the fifth-speed shift stage, the seventh-speed shift stage, or the ninth-speed shift stage) of the first-speed shift stage to the ninth-speed shift stage is established, and the second clutch C2 is engaged when an even-numbered shift stage (i.e., the second-speed shift stage, the fourth-speed shift stage, the sixth-speed shift stage, or the eighth-speed shift stage) of the first-speed shift stage to the ninth-speed shift stage is established. In a sequential shift between continuous shift stages, a clutch-to-clutch shift free from a torque interruption can be performed.

As an exemplary procedure of an upshift, a procedure of a sequential shift from the second-speed shift stage to the third-speed shift stage will be described. In a state where the second-and-fourth speed synchronizing device S3 couples the second-speed input gear 28 to the second input shaft 12 and the second clutch C2 is engaged to establish the second-speed shift stage, a pre-shift is performed, in which the third-and-fifth speed synchronizing device S1 couples the third-speed input gear 24 to the first input shaft 11 in advance. Then, by engaging the first clutch C1 while disengaging the second clutch C2, an upshift from the second-speed shift stage to the third-speed shift stage can be achieved without an interruption of torque transmission.

As an exemplary procedure of a downshift, a procedure of a sequential shift from the fifth-speed shift stage to the fourth-speed shift stage will be described. In a state where the third-and-fifth speed synchronizing device S1 couples the fifth-speed input gear 25 to the first input shaft 11 and the first clutch C1 is engaged to establish the fifth-speed shift stage, a pre-shift is performed, in which the second-and-fourth speed synchronizing device S3 couples the fourth-speed input gear 29 to the second input shaft 12 in advance. Then, by engaging the second clutch C2 while disengaging the first clutch C1, a downshift from the fifth-speed shift stage to the fourth-speed shift stage can be achieved without an interruption of torque transmission.

Procedures of sequential shifts between continuous shift stages have been described. Even in the case of a jump shift between discrete shift stages, a clutch-to-clutch shift can be performed in the same procedure as above, as long as it is a jump shift between an even-numbered shift stage and an odd-numbered shift stage. That is, in a state where the second clutch C2 is engaged and an even-numbered shift stage is established, a pre-shift to a target odd-numbered shift stage is performed. Then, by disengaging the second clutch C2 and engaging the first clutch C1, a clutch-to-clutch shift from the even-numbered shift stage to the odd-numbered shift stage can be achieved. Similarly, in a state where the first clutch C1 is engaged and an odd-numbered shift stage is established, a pre-shift to a target even-numbered shift stage is performed. Then, by disengaging the first clutch C1 and engaging the second clutch C2, a clutch-to-clutch shift from the odd-numbered shift stage to the even-numbered shift stage can be achieved.

However, the procedure of a jump shift from an even-numbered shift stage to another even-numbered shift stage, or from an odd-numbered shift stage to another odd-numbered shift stage, is more complex.

Figure 4:
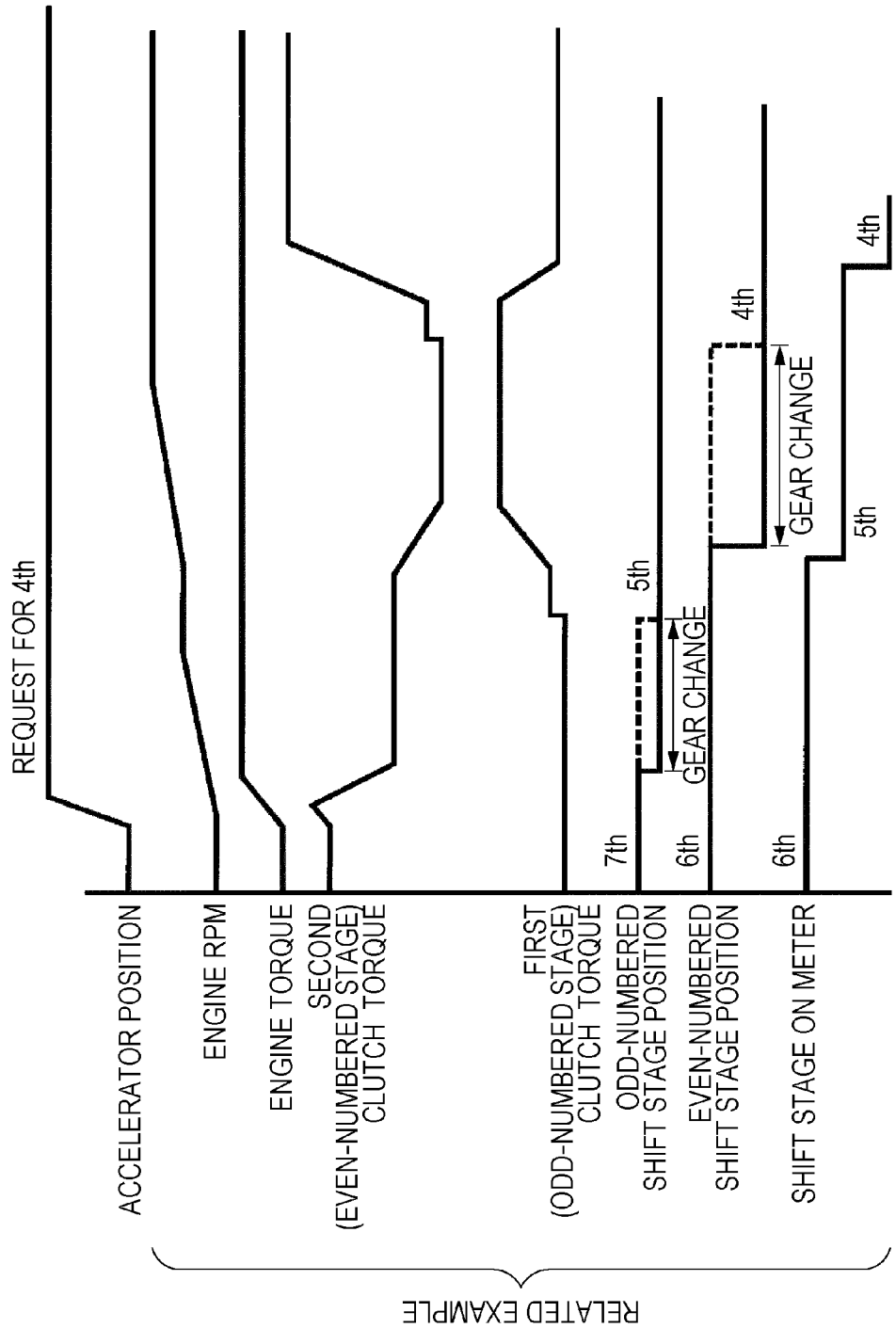
FIG. 4 is a timing diagram showing a jump shift from the sixth-speed shift stage to the fourth-speed shift stage according to a related example.

FIG. 4 is a timing diagram showing a procedure of a jump shift from the sixth-speed shift stage (even-numbered shift stage) to the fourth-speed shift stage (even-numbered shift stage) according to a related example. This situation occurs when the driver depresses a kickdown operation which involves rapidly depressing the accelerator from point A (see the shift map of FIG. 3) at which the sixth-speed shift stage is established at a predetermined vehicle speed and a predetermined accelerator position to point B.

Assume that in a state where the sixth-and-eighth speed synchronizing device S4 couples the sixth-speed input gear 30 to the second input shaft 12 and the second clutch C2 is engaged to establish the sixth-speed shift stage, a pre-shift is performed, in which the seventh-and-ninth speed synchronizing device S2 couples the seventh-speed input gear 26 to the first input shaft 11. The jump shift from the sixth-speed shift stage to the fourth-speed shift stage is performed via the fifth-speed shift stage in this case. That is, while the currently engaged second clutch C2 is slipped in response to kickdown, a gear change is performed, in which the seventh-and-ninth speed synchronizing device S2 separates the seventh-speed input gear 26 from the first input shaft 11 and the third-and-fifth speed synchronizing device S1 couples the fifth-speed input gear 25 to the first input shaft 11. Then, another gear change is performed, in which the sixth-and-eighth speed synchronizing device S4 separates the sixth-speed input gear 30 from the second input shaft 12 and the second-and-fourth speed synchronizing device S3 couples the fourth-speed input gear 29 to the second input shaft 12. During the latter gear change, the second clutch C2 is disengaged and the first clutch C1 is slipped to prevent an interruption of driving force by using the fifth-speed shift stage. Finally, the second clutch C2 is engaged and the first clutch C1 is disengaged to establish the target fourth-speed shift stage.

As described above, the jump shift control of the related art requires two gear changes. This takes a long time and results in low shift responsiveness.

Figure 5:
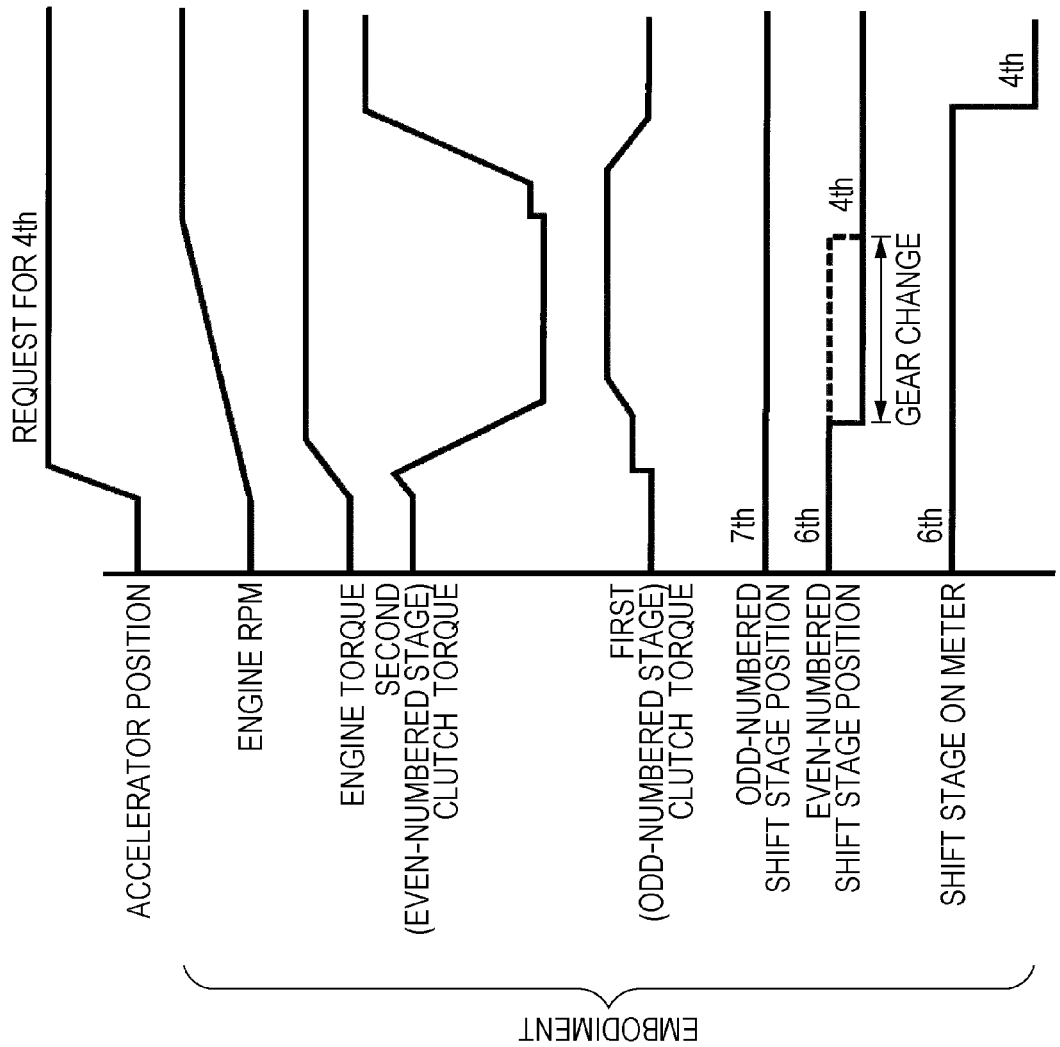
FIG. 5 is a timing diagram showing a jump shift from the sixth-speed shift stage to the fourth-speed shift stage according to the embodiment.

FIG. 5 is a timing diagram of the embodiment corresponding to the related example of FIG. 4. FIG. 5 shows a procedure of a jump shift from the sixth-speed shift stage (even-numbered shift stage) to the fourth-speed shift stage (even-numbered shift stage).

As in the related example, a jump shift to the fourth-speed shift stage starts in a state where the sixth-speed shift stage is established and a pre-shift is performed, in which the seventh-and-ninth speed synchronizing device S2 couples the seventh-speed input gear 26 to the first input shaft 11. However, instead of passing through the fifth-speed shift stage, the jump shift of the embodiment involves using the seventh-speed shift stage currently selected by the pre-shift. That is, while the currently engaged second clutch C2 is disengaged in response to kickdown, the first clutch C1 is slipped to prevent an interruption of driving force using the seventh-speed shift stage. During this operation, the sixth-and-eighth speed synchronizing device S4 separates the sixth-speed input gear 30 from the second input shaft 12 and the second-and-fourth speed synchronizing device S3 couples the fourth-speed input gear 29 to the second input shaft 12. After this gear change, the second clutch C2 is engaged and the first clutch C1 is disengaged to establish the target fourth-speed shift stage.

In the present embodiment, as described above, a jump shift between even-numbered shift stages or odd-numbered shift stages is performed using a shift stage currently selected by a pre-shift. Since this requires only one gear change, a significant increase in shift responsiveness can be achieved.

Figure 6:
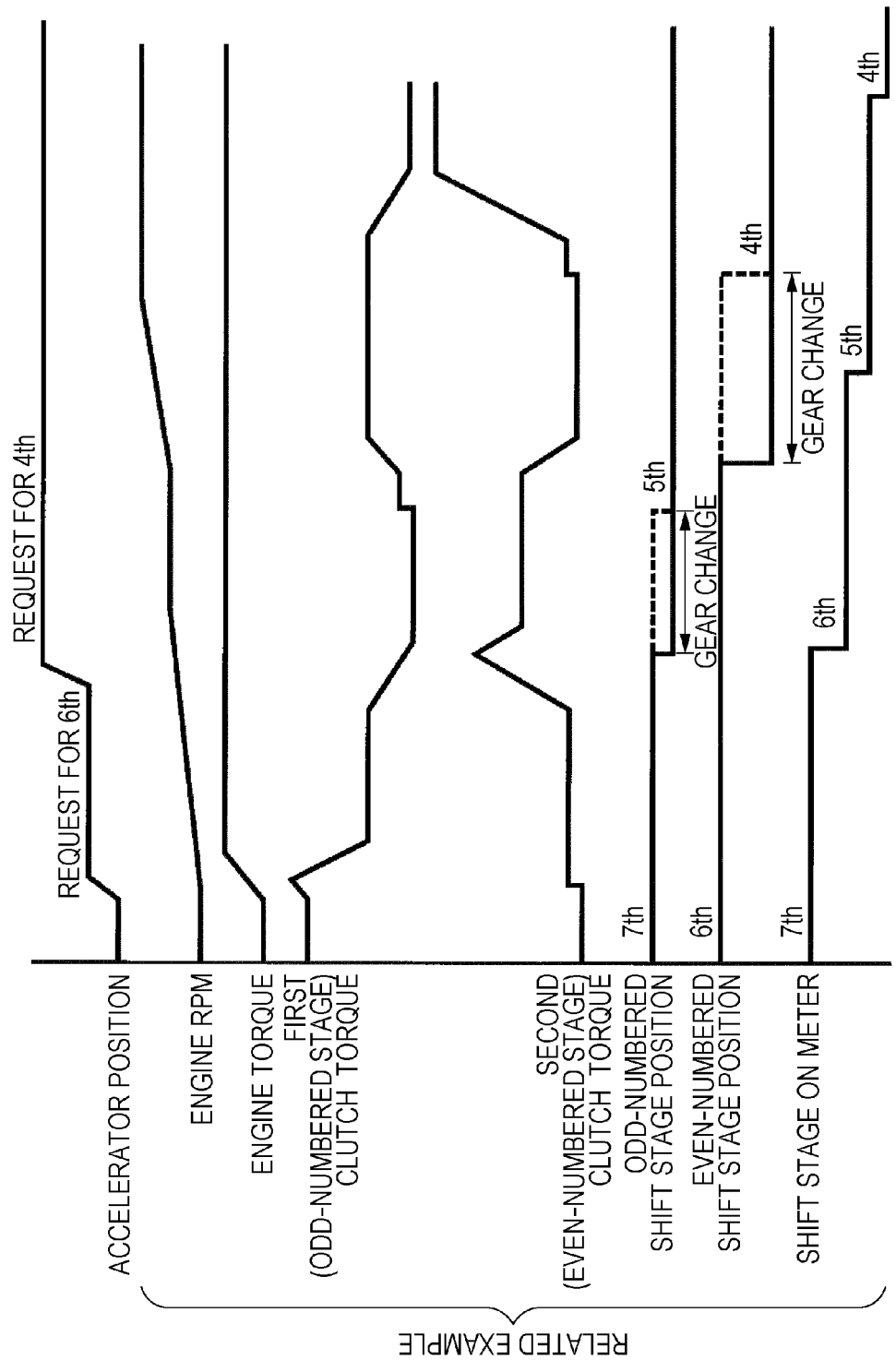
FIG. 6 is a timing diagram showing a jump shift from the seventh-speed shift stage to the fourth-speed shift stage according to the related example.
Figure 7:
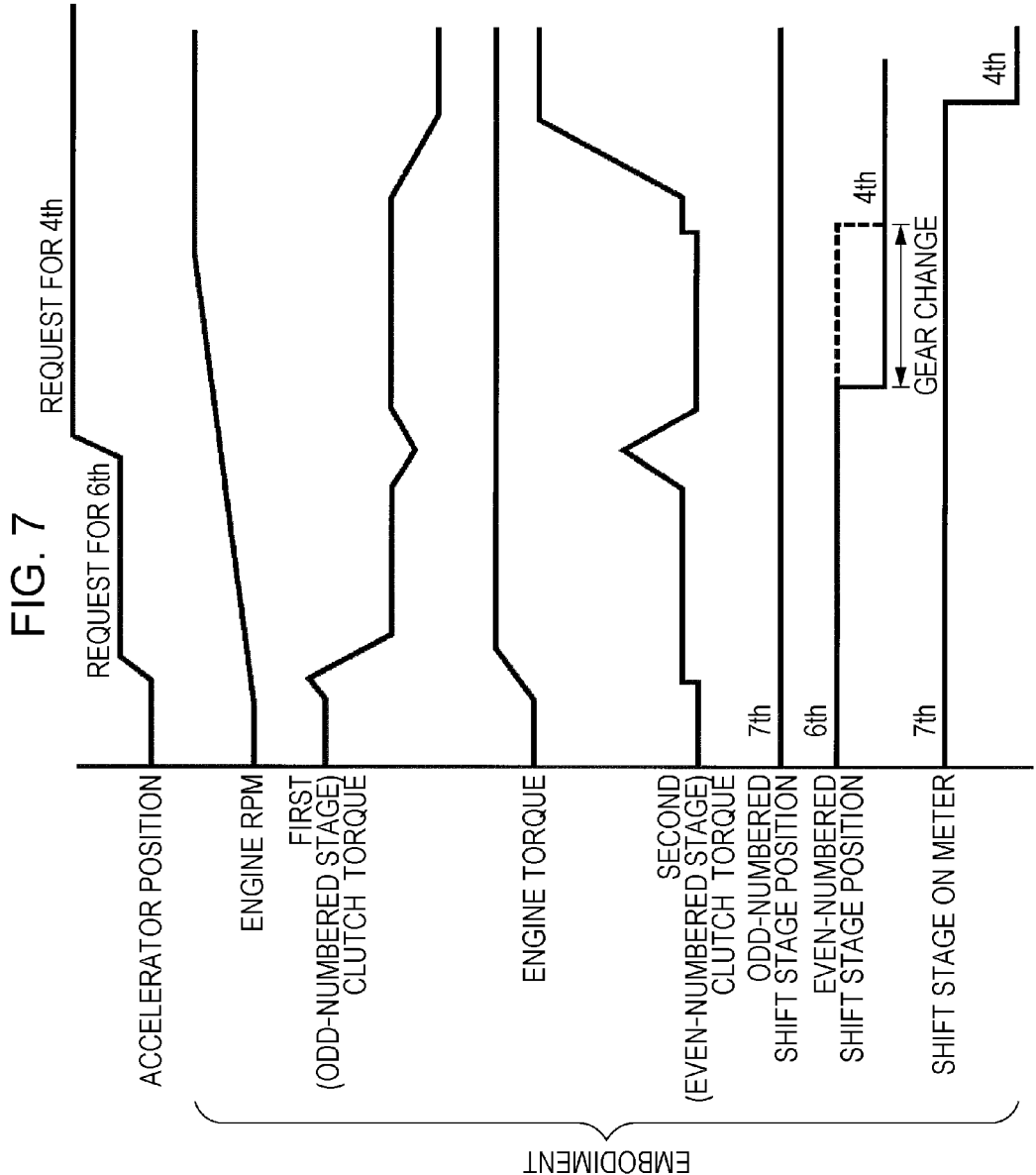
FIG. 7 is a timing diagram showing a jump shift from the seventh-speed shift stage to the fourth-speed shift stage according to the embodiment.

FIGS. 6 and 7 are each a timing diagram showing a procedure of a jump shift from the seventh-speed shift stage (odd-numbered shift stage) to the fourth-speed shift stage (even-numbered shift stage). In this procedure, while the vehicle is running with the seventh-speed shift stage established and the sixth-speed shift stage selected by a pre-shift, the accelerator is depressed and a downshift to the sixth-speed shift stage takes place. During the downshift, the accelerator is further depressed and a downshift from the sixth-speed shift stage to the fourth-speed shift stage takes place. This situation occurs when, immediately after depressing the accelerator from point C (see the shift map of FIG. 3) at which the seventh-speed shift stage is established at a predetermined vehicle speed and a predetermined accelerator position to point D, the driver further depresses the accelerator to point E.

In the related example of FIG. 6, the pre-shift to the sixth-speed shift stage is already completed when the downshift to the sixth-speed shift stage is requested during running at the seventh-speed shift stage. Therefore, the downshift to the sixth-speed shift stage is executed by disengaging the currently engaged first clutch C1 while slipping it and engaging the currently disengaged second clutch C2 while slipping it. If the accelerator is further depressed immediately before the sixth-speed shift stage is established and a downshift to the fourth-speed shift stage is requested, a jump shift from the sixth-speed shift stage to the fourth-speed shift stage (i.e., between even-numbered shift stages) is executed. This procedure is the same as that described with reference to FIG. 4.

The downshift from the seventh-speed shift stage to the fourth-speed shift stage in the related example also requires two gear changes and has a problem of low shift responsiveness.

In the embodiment illustrated in FIG. 7, the procedure of the downshift from the seventh-speed shift stage to the sixth-speed shift stage is the same as that of the related example illustrated in FIG. 6, and the procedure of the downshift from the sixth-speed shift stage to the fourth-speed shift stage is the same as that of the embodiment illustrated in FIG. 5. Since this requires only one gear change, a significant increase in shift responsiveness can be achieved.

The above-described effects of the present embodiment will now be described with reference to the flowcharts of FIGS. 8 and 9.

Figure 8:
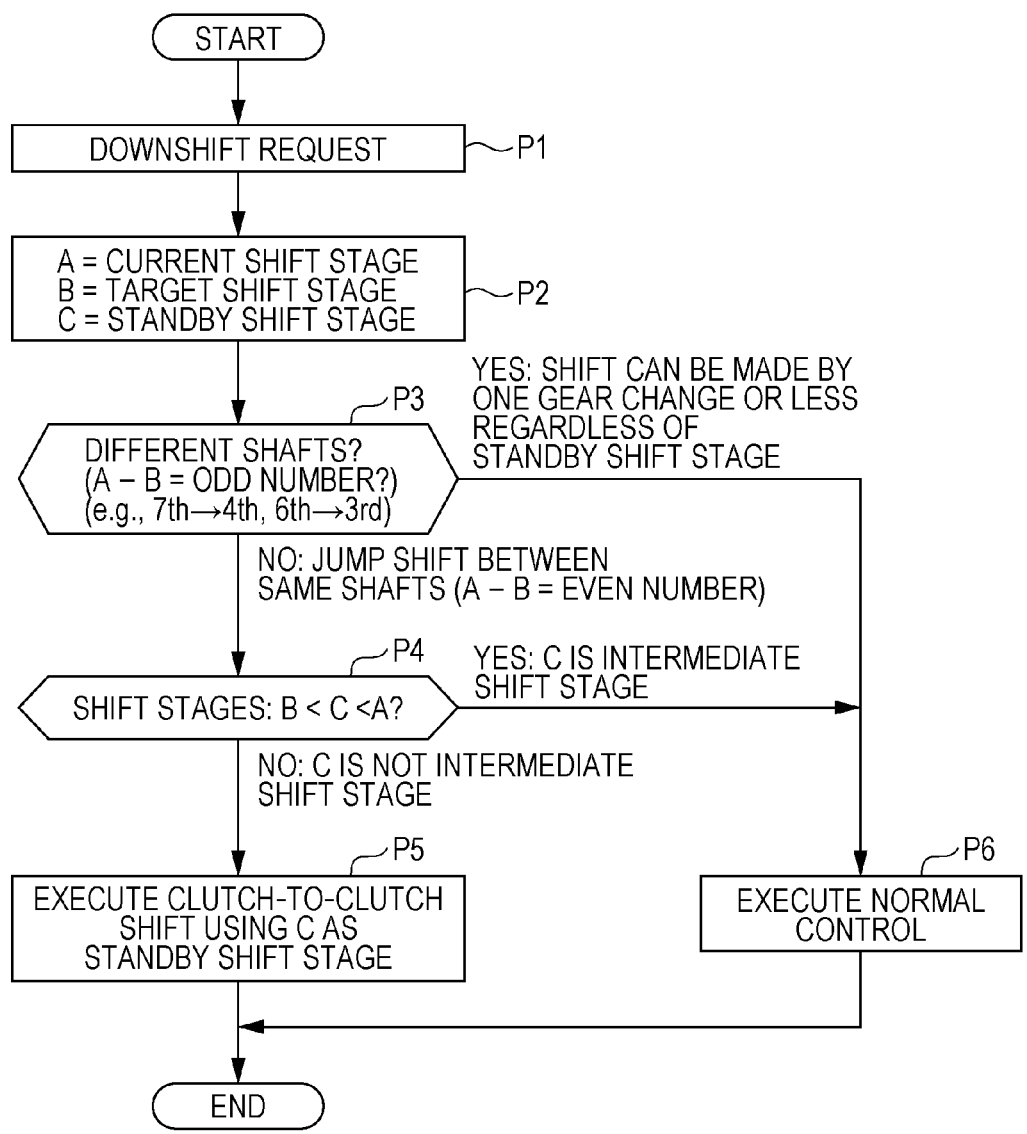
FIG. 8 is a flowchart illustrating a shift control process of the transmission according to the embodiment.

In step P1 in the flowchart of FIG. 8, on the basis of an accelerator position detected by the accelerator position detector M1 and a vehicle speed detected by the vehicle speed detector M2, the target shift stage estimating unit M3 estimates a target shift stage to which a jump downshift is required. In step P2, a shift stage currently established is defined as a current shift stage A, a shift stage to be established is defined as a target shift stage B, and a shift stage currently selected by a pre-shift is defined as a standby shift stage C. In step P3, a determination is made as to whether the current shift stage A and the target shift stage B are on different shafts, that is, whether one is an even-numbered shift stage and the other is an odd-numbered shift stage, by determining whether a value obtained by subtracting B from A (A−B) is an odd number. If A−B is an odd number, the jump downshift to be performed is either a shift from an even-numbered shift stage to an odd-numbered shift stage, or a shift from an odd-numbered shift stage to an even-numbered shift stage. Therefore, in step P6, the shift controller M4 executes shift control between different shafts as in the related art.

If it is determined in step P3 that the current shift stage A and the target shift stage B are on the same shafts, that is, if the jump downshift to be performed is either a shift between even-numbered shift stages or a shift between odd-numbered shift stages, the process proceeds to step P4, where the current shift stage A, the target shift stage B, and the standby shift stage C are compared. If the comparison yields B<C<A and the standby shift stage C lies between the current shift stage A and the target shift stage B, that is, for example, if the fifth-speed shift stage (standby shift stage C) is currently selected by a pre-shift during a downshift from the sixth-speed shift stage (current shift stage A) to the fourth-speed shift stage (target shift stage B), the process proceeds to step P6, where shift control between the same shafts is executed as in the related art.

Specifically, while the sixth-speed shift stage is established, the second clutch C2 is disengaged and the first clutch C1 is slipped to prevent an interruption of driving force using the fifth-speed shift stage selected by a pre-shift. Then, after a gear change which involves separating the sixth-speed input gear 30 from the second input shaft 12 and coupling the fourth-speed input gear 29 to the second input shaft 12, the second clutch C2 is engaged and the first clutch C1 is disengaged to establish the fourth-speed shift stage.

If the comparison in step P4 does not yield B<C<A and the standby shift stage C does not lie between the current shift stage A and the target shift stage B, that is, for example, if, as described with reference to the timing diagram of FIG. 5, the seventh-speed shift stage (standby shift stage C) is currently selected by a pre-shift during a downshift from the sixth-speed shift stage (current shift stage A) to the fourth-speed shift stage (target shift stage B), the process proceeds to step P5, where a jump shift between the same shafts using the standby shift stage C according to the present embodiment is executed.

The display unit D (see FIG. 2) of the meter panel displays a currently established shift stage. This means that when the current shift stage A is the sixth-speed shift stage, the target shift stage B is the fourth-speed shift stage, and the standby shift stage C is the seventh-speed shift stage as described with reference to the timing diagram of FIG. 5, the indication in the display unit D may change from "6th speed" to "7th speed", and then to "4th speed" despite being during the downshift and may confuse the driver.

Figure 9:
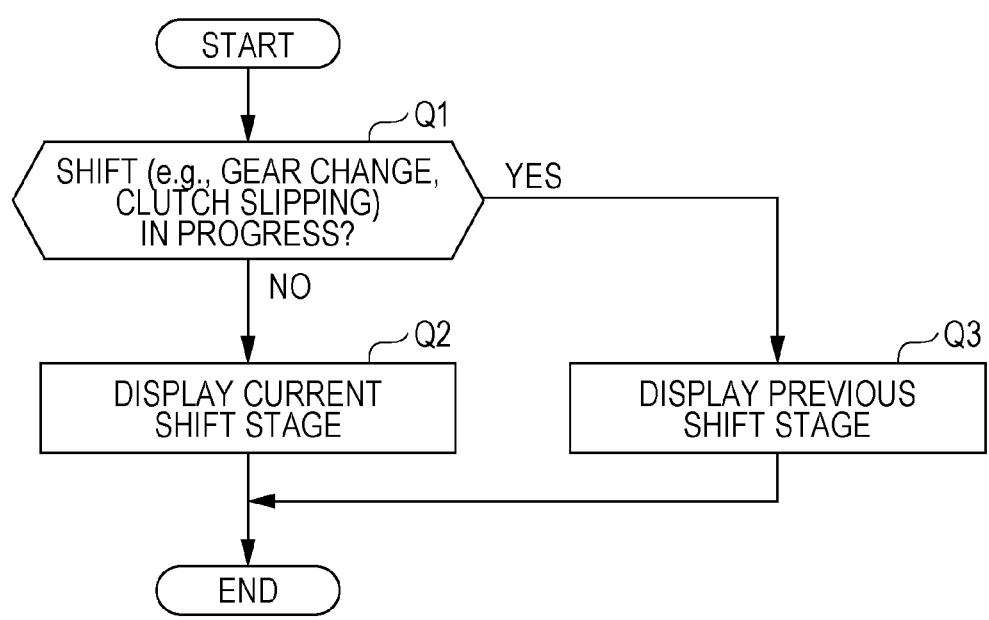
FIG. 9 is a flowchart illustrating a display control process of a display unit according to the embodiment.

In the present embodiment, as in the flowchart of FIG. 9, a determination is made in step Q1 as to whether a shift involving a gear change or clutch slipping is in progress. If such a shift is not in progress, the current shift stage is displayed in step Q2. If a shift involving a gear change or clutch slipping is in progress in step Q1, the previous shift stage (established before the start of the shift) is displayed in step Q3. This can prevent the driver from being confused, during a jump shift, by display of a shift stage which does not lie between the current shift stage and the target shift stage.

According to the present embodiment, in a jump shift from the current shift stage to the target shift stage between the same input shafts, when the standby shift stage for a pre-shift does not lie between the current shift stage and the target shift stage, one clutch engaged at the current shift stage is disengaged and the other clutch disengaged at the current shift stage is engaged while being slipped. While the one clutch is being disengaged, a synchronizing device for the current shift stage is disengaged and a synchronizing device for the target shift stage is engaged. Then, the other clutch is disengaged and the one clutch is engaged. Thus, just by changing the synchronizing device once, a jump shift between the same input shafts can be reliably performed. It is thus possible to significantly reduce the shift time and improve shift responsiveness through simple shift control.

The shift control is executed only when the target shift stage is a lower-speed shift stage than the current shift stage, that is, only in the case of a downshift. Therefore, when kickdown is performed in a sporty car for hard acceleration, a quick downshift can be achieved without a torque interruption.

As described above, the display unit D does not display a standby shift stage during shift control. This can prevent the driver from being confused, during the shift, by display of a shift stage which does not lie between the current shift stage and the target shift stage.

Although embodiments of the present disclosure have been described, various design changes can be made without departing from the scope of the present disclosure.

For example, the outline of the transmission of the present disclosure is not limited to the embodiments described above.

A first aspect of an embodiment proposes a shift control device for an automatic transmission, including a first input shaft, a second input shaft, and an output shaft disposed parallel to each other; a first clutch and a second clutch capable of transmitting a driving force of a drive source to the first input shaft and the second input shaft, respectively; and a plurality of gear trains capable of establishing a plurality of shift stages through a selecting operation of a plurality of synchronizing devices between the first and second input shafts and the output shaft. In the shift control device, when a predetermined current shift stage is established between the output shaft and one input shaft of the first and second input shafts, the one input shaft being an input shaft to which the driving force is transmitted by engagement of one clutch of the first and second clutches, and then a target shift stage different from the current shift stage and at which the one clutch is engaged is estimated on the basis of driving conditions of a vehicle and a driver's intention, a predetermined one of the synchronizing devices is engaged to perform a pre-shift operation which allows standby in a state where the output shaft and the other input shaft of the first and second input shafts, the other input shaft being an input shaft to which the driving force is not currently transmitted, are connected by a gear train for the standby shift stage different from the current shift stage and the target shift stage; and when the standby shift stage does not lie between the current shift stage and the target shift stage, the one clutch is disengaged and the other clutch of the first and second clutches is engaged while being slipped, and during the disengagement of the one clutch, a synchronizing device for the current shift stage is disengaged and a synchronizing device for the target shift stage is engaged, and then the other clutch is disengaged and the one clutch is engaged.

With the configuration of the first aspect, when a jump shift from the current shift stage to the target shift stage is performed between the same input shafts in a twin-clutch automatic transmission, even when the standby shift stage for a pre-shift does not lie between the current shift stage and the target shift stage, the jump shift between the same input shafts can be reliably performed without a torque interruption just by changing the synchronizing device once. It is thus possible to significantly reduce the shift time and improve shift responsiveness through simple shift control.

According to a second aspect of the embodiment, the shift control device for the automatic transmission according to the first aspect may further include an accelerator position detector configured to detect an accelerator position, a vehicle speed detector configured to detect a vehicle speed, and a target shift stage estimating unit configured to estimate the target shift stage on the basis of the accelerator position and the vehicle speed. In the shift control device, the shift control may be executed when the target shift stage is a lower-speed shift stage than the current shift stage.

With the configuration of the second aspect, when kickdown is performed for hard acceleration in a sporty car, a quick downshift can be achieved without a torque interruption.

According to a third aspect of the embodiment, the shift control device for the automatic transmission according to the first aspect may further include a display unit capable of displaying the current shift stage, and the display unit may not display the standby shift stage during the shift control.

With the configuration of the third aspect, it is possible to prevent the driver from being confused, during a shift, by display of a shift stage which does not lie between the current shift stage and the target shift stage.

A first output shaft 13 of the embodiment corresponds to an output shaft of the present disclosure; a third-and-fifth speed synchronizing device S1, a seventh-and-ninth speed synchronizing device S2, a second-and-fourth speed synchronizing device S3, and a sixth-and-eighth speed synchronizing device S4 of the embodiment correspond to a plurality of synchronizing devices of the present disclosure; and an engine E of the embodiment correspond to a drive source of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A shift control apparatus for an automatic transmission, the apparatus comprising:
a first input shaft, a second input shaft, and an output shaft disposed parallel to each other;
a first clutch and a second clutch capable of transmitting a driving force of a drive source to the first input shaft and the second input shaft, respectively; and
a plurality of gear trains capable of establishing a plurality of shift stages through a selecting operation of a plurality of synchronizing devices between the first and second input shafts and the output shaft,
wherein when a predetermined current shift stage is established between the output shaft and one input shaft of the first and second input shafts, the one input shaft being the first or second input shaft to which the driving force is transmitted by engagement of one clutch of the first and second clutches, and then a target shift stage different from the current shift stage and at which the one clutch is engaged is estimated on a basis of driving conditions of a vehicle and a driver's intention, a predetermined one of the synchronizing devices is engaged to perform a pre-shift operation which allows standby in a state where the output shaft and the other input shaft of the first and second input shafts, the other input shaft being the first or second input shaft to which the driving force is not currently transmitted, are connected by a gear train for the standby shift stage different from the current shift stage and the target shift stage; and
when the standby shift stage does not lie between the current shift stage and the target shift stage, the one clutch is disengaged and the other clutch of the first and second clutches is engaged while slipping, and during the disengagement of the one clutch, a synchronizing device for the current shift stage is disengaged and a synchronizing device for the target shift stage is engaged, and then the other clutch is disengaged and the one clutch is engaged.

2. The shift control apparatus according to claim 1, further comprising:
an accelerator position detector configured to detect an accelerator position;
a vehicle speed detector configured to detect a vehicle speed; and a target shift stage estimating unit configured to estimate the target shift stage on the basis of the accelerator position and the vehicle speed,
wherein the shift control is executed when the target shift stage is a lower-speed shift stage than the current shift stage.

3. The shift control apparatus according to claim 1, further comprising a display unit capable of displaying the current shift stage,
wherein the display unit does not display the standby shift stage during the shift control.

4. The shift control apparatus according to claim 3, wherein the display unit displays a shift stage established before start of the shift control during the shift control.

5. A shift control apparatus for an automatic transmission, comprising:
a controller configured to control the automatic transmission, the automatic transmission comprising:
a first input shaft, a second input shaft, and an output shaft disposed parallel to each other;
a first clutch and a second clutch to transmit a driving force of a drive source to the first input shaft and the second input shaft, respectively; and
gear trains to establish shift stages between the first and second input shafts and the output shaft through selecting synchronizing devices,
wherein in a case where a predetermined current shift stage is established between the output shaft and the first input shaft to which the driving force is transmitted through engagement of the first clutch and in a case where a target shift stage which is different from the predetermined current shift stage and at which the first clutch is engaged is estimated based on driving conditions of a vehicle and a driver's intention, the controller controls a predetermined one of the synchronizing devices to be engaged to perform a pre-shift operation which connects the output shaft and the second input shaft to which the driving force is not transmitted using a gear train among the gear trains so as to establish a standby shift stage different from the predetermined current shift stage and the target shift stage, and
wherein in a case where the standby shift stage does not lie between the predetermined current shift stage and the target shift stage, the controller controls the first clutch to be disengaged and the second clutch to be engaged, and then controls a synchronizing device among the synchronizing devices for the predetermined current shift stage to be disengaged and a synchronizing device among the synchronizing devices for the target shift stage to be engaged during a disengagement of the first clutch, and then controls the second clutch to be disengaged and the first clutch to be engaged.

6. The shift control apparatus according to claim 5, further comprising:
an accelerator position detector configured to detect an accelerator position;
a vehicle speed detector configured to detect a vehicle speed; and
a target shift stage estimating device configured to estimate the target shift stage based on the accelerator position and the vehicle speed,
wherein the controller executes a shift control in a case where the target shift stage is a lower-speed shift stage than the predetermined current shift stage.

7. The shift control apparatus according to claim 5, further comprising a display to display the predetermined current shift stage,
wherein the display does not display the standby shift stage while the controller executes a shift control.

8. The shift control apparatus according to claim 7, wherein the display displays a shift stage established before start of the shift control while the controller executes the shift control.

9. A shift control apparatus for an automatic transmission, comprising:
a controller configured to control the automatic transmission, the automatic transmission comprising:
a first input shaft, a second input shaft, and an output shaft disposed parallel to each other;
a first clutch and a second clutch to transmit a driving force of a drive source to the first input shaft and the second input shaft, respectively; and
gear trains to establish shift stages between the first and second input shafts and the output shaft through selecting synchronizing devices,
wherein when a predetermined current shift stage is established between the output shaft and the first input shaft to which the driving force is transmitted through engagement of the first clutch and when a target shift stage which is different from the predetermined current shift stage and at which the first clutch is engaged is estimated, the controller controls a predetermined one of the synchronizing devices to be engaged so as to establish a standby shift stage different from the predetermined current shift stage and the target shift stage, and
wherein when the standby shift stage does not lie between the predetermined current shift stage and the target shift stage, the controller controls the first clutch to be disengaged and the second clutch to be engaged, and controls a synchronizing device among the synchronizing devices for the predetermined current shift stage to be disengaged and a synchronizing device among the synchronizing devices for the target shift stage to be engaged during a disengagement of the first clutch, and then controls the second clutch to be disengaged and the first clutch to be engaged.

10. The shift control apparatus according to claim 9, further comprising:
an accelerator position detector configured to detect an accelerator position;
a vehicle speed detector configured to detect a vehicle speed; and
a target shift stage estimating device configured to estimate the target shift stage based on the accelerator position and the vehicle speed,
wherein the controller executes a shift control in a case where the target shift stage is a lower-speed shift stage than the predetermined current shift stage.

11. The shift control apparatus according to claim 9, further comprising a display to display the predetermined current shift stage,
wherein the display does not display the standby shift stage while the controller executes a shift control.

12. The shift control apparatus according to claim 11, wherein the display displays a shift stage established before start of the shift control while the controller executes the shift control.

* * * * *